US009454926B2

(12) United States Patent
Chen et al.

(10) Patent No.: US 9,454,926 B2
(45) Date of Patent: Sep. 27, 2016

(54) IMAGE DATA PROCESSING METHOD AND DEVICE OF USING THE SAME

(71) Applicant: Shenzhen China Star Optoelectronics Technology Co., Ltd., Guangdong (CN)

(72) Inventors: Wei Chen, Guangdong (CN); Xiaoping Tan, Guangdong (CN); Jianjun Xie, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 14/407,998

(22) PCT Filed: Oct. 13, 2014

(86) PCT No.: PCT/CN2014/088504
§ 371 (c)(1),
(2) Date: Dec. 15, 2014

(87) PCT Pub. No.: WO2016/041223
PCT Pub. Date: Mar. 24, 2016

(65) Prior Publication Data

US 2016/0086530 A1 Mar. 24, 2016

(30) Foreign Application Priority Data

Sep. 18, 2014 (CN) .......................... 2014 1 0476788

(51) Int. Cl.
*G09G 3/36* (2006.01)
*G09G 5/02* (2006.01)
*G09G 1/28* (2006.01)
*H04N 9/64* (2006.01)
*H04N 9/30* (2006.01)
*G06T 5/00* (2006.01)
*G06T 5/40* (2006.01)
*G09G 3/20* (2006.01)

(52) U.S. Cl.
CPC .......... *G09G 3/2074* (2013.01); *G09G 3/2003* (2013.01); *G09G 2340/06* (2013.01)

(58) Field of Classification Search
CPC combination set(s) only.
See application file for complete search history.

(56) References Cited

U.S. PATENT DOCUMENTS 5,844,532 A * 12/1998 Silverbrook ......... G09G 3/3629 345/597
2005/0140612 A1 6/2005 Baek
2005/0225563 A1 10/2005 Brown Elliott et al.
2005/0225575 A1 10/2005 Brown Elliott et al.
2008/0084524 A1* 4/2008 Inuzuka ............... G09G 3/3413 349/108
2009/0058873 A1* 3/2009 Brown Elliott ......... G06T 5/009 345/589

(Continued)

FOREIGN PATENT DOCUMENTS

CN 103021316 4/2013
CN 103928011 7/2014

(Continued)

*Primary Examiner* — Wesner Sajous

(57) ABSTRACT

An image data processing method and device are disclosed. The method comprising: receiving a first display data combination, the first display data combination comprises red, green, and blue sub-pixel display data; transforming the first display data combination into a second display data combination, the second display data combination comprises red, green, blue, and white sub-pixel display data; transforming the second display data combination into a third display data combination, the third display data combination comprises any three of the red, green, blue, and white sub-pixel display data. The disclosed method can raise image contrast.

18 Claims, 7 Drawing Sheets

(56) References Cited

U.S. PATENT DOCUMENTS

2010/0103200 A1* 4/2010 Langendijk .............. G09G 5/02 345/690
2010/0259556 A1* 10/2010 Inuzuka ............... G09G 3/3611 345/604
2015/0325183 A1 11/2015 Chen et al.

FOREIGN PATENT DOCUMENTS

CN 103996368 8/2014
JP 0990916 4/1997

* cited by examiner

IMAGE DATA PROCESSING METHOD AND DEVICE OF USING THE SAME

RELATED APPLICATIONS

This application is a National Phase of PCT Patent Application No. PCT/CN2014/088504 having International filing date of Oct. 13, 2014, which claims the benefit of priority of Chinese Patent Application No. 201410476788.3 filed on Sep. 18, 2014. The contents of the above applications are all incorporated by reference as if fully set forth herein in their entirety.

BACKGROUND OF THE INVENTION

1. Field of Invention

The present invention relates to a field of displays, and in particular to an image data processing method and a device using the same.

2. Description of Prior Art

In traditional display panels, R (red), green (G), and blue (B) are usually to be displayed as a pixel.

Recently, RGBW (white) are displayed as a pixel in a display panel.

Because RGBW technology adds W sub-pixels, back light transparency gets higher, luminance of white image increases, and image contrast also raises.

For example, four continuous pixels (12 sub-pixels) have three W sub-pixels to replace one R sub-pixel, one G sub-pixel, and one B sub-pixel, to keep the resolution rate of the display panel unchanged.

In reality, the prior art has at least issues as below:

First, color edge, fuzzy edge or even errors are accompanied with displaying black characters on white background. This phenomenon can be eliminated to a certain level by filtration of nine points of edges, but the effect still needs to be improved, and since two columns of cache are needed, additional costs are added.

Second, color tone will be inconsistent after replacing the R sub-pixel, the G sub-pixel, and the B sub-pixel with the W sub-pixels.

Therefore, a new technical proposal is needed to solve the problems in the prior art.

SUMMARY OF THE INVENTION

An objective of the present invention is to provide an image data processing method and a device, which is able to raise image contrast while effectively keeping the resolution rate, color tone, and color saturation of an original image.

To achieve the above objective, the present invention provides a technical solution as follows.

The present invention provides an image data processing method, comprising:

(A), receiving a first display data combination, the first display data combination comprises a first predetermined quantity of a first pixel display data. The first pixel display data comprises a red sub-pixel display data, a green sub-pixel display data, and a blue sub-pixel display data.

(B), transforming the first display data combination into a second display data combination, the second display data combination comprises the first predetermined quantity of a second pixel display data. The second pixel display data comprises the red sub-pixel display data, the green sub-pixel display data, the blue sub-pixel display data, and a white sub-pixel display data.

(C), transforming the second display data combination into a third display data combination, the third display data combination comprises the first predetermined quantity of a third pixel display data. The third pixel display data comprises any three of the red sub-pixel display data, the green sub-pixel display data, the blue sub-pixel display data, and a white sub-pixel display data. The third display data combination is used to display a corresponding image by a pixel array.

(B) further comprises:

(b1), generating the second display data combination by adding the white sub-pixel display data into each of the first pixel display data of the first display data combination by a first transforming module.

The pixel array comprises the first predetermined quantity of pixel units, with at least two of the pixel units lined up along a first direction. Each of the pixel units comprises any three of red sub-pixels according to the red sub-pixel display data, green sub-pixels according to the green sub-pixel display data, blue sub-pixels according to the blue sub-pixel display data, and white sub-pixels according to the white sub-pixel display data. Any three of the red sub-pixels, the green sub-pixels, the blue sub-pixels, and the white sub-pixels are lined up along the first direction. Along the first direction of the pixel array, at least one green sub-pixel, at least one blue sub-pixel, and at least one white sub-pixel are disposed between any two of the red sub-pixels. At least one red sub-pixel, at least one blue sub-pixel, and at least one white sub-pixel are disposed between any two of the green sub-pixels. At least one green sub-pixel, at least one red sub-pixel, and at least one white sub-pixel are disposed between any two of the blue sub-pixels. At least one green sub-pixel, at least one blue sub-pixel, and at least one red sub-pixel are disposed between any two of the white sub-pixels.

In the image data processing method mentioned above, the step (C) further comprises:

(c1), distributing the red sub-pixel display data, the green sub-pixel display data, the blue sub-pixel display data, and the white sub-pixel display data of the second display data combination to a predetermined data unit to generate a distribution result.

(c2), generating the third display data combination by the distribution result.

The predetermined data unit corresponds to the pixel array, the predetermined unit comprises: a second predetermined quantity of first data sub-units, the first data sub-units correspond to the red sub-pixels; a third predetermined quantity of second data sub-units, the second data sub-units correspond to the green sub-pixels; a fourth predetermined quantity of third data sub-units, the third data sub-units correspond to the blue sub-pixels; a fifth predetermined quantity of fourth data sub-units, the fourth data sub-units correspond to the white sub-pixels. A sum of the second predetermined quantity, the third predetermined quantity, the fourth predetermined quantity, and the fifth predetermined quantity is triple the first predetermined quantity. All of the second predetermined quantity, the third predetermined quantity, the fourth predetermined quantity, and the fifth predetermined quantity are less than the first predetermined quantity.

In the image data processing method mentioned above, the step (c1) comprises:

(c11), distributing the first predetermined quantity of the red sub-pixel display data to the second predetermined quantity of the first data sub-units to generate a first distribution result.

(c12), distributing the first predetermined quantity of the green sub-pixel display data to the third predetermined quantity of the second data sub-units to generate a second distribution result.

(c13), distributing the first predetermined quantity of the blue sub-pixel display data to the fourth predetermined quantity of the third data sub-units to generate a third distribution result.

(c14), distributing the first predetermined quantity of the white sub-pixel display data to the fifth predetermined quantity of the fourth data sub-units to generate a fourth distribution result.

The step (c2) further comprises:

(c21), generating the third display data combination according to the first distribution result, the second distribution result, the third distribution result, and the fourth distribution result.

In the image data processing method mentioned above, (c11) comprises:

(c111), calculating a first sharable property-value of each of the red sub-pixel display data.

(c112), selecting the second predetermined quantity of the red sub-pixel display data from the first predetermined quantity of the red sub-pixel display data based on each of the first sharable property-values.

(c113), disposing the second predetermined quantity of the red sub-pixel display data to the second predetermined quantity of the first data sub-units to generate the first distribution result.

(c12) comprises:

(c121), calculating a second sharable property-value of each of the green sub-pixel display data.

(c122), selecting the third predetermined quantity of the green sub-pixel display data from the first predetermined quantity of the green sub-pixel display data based on each of the second sharable property-values.

(c123), disposing the third predetermined quantity of the green sub-pixel display data to the third predetermined quantity of the second data sub-units to generate the second distribution result.

The step (c13) comprises:

(c131), calculating a third sharable property-value of each of the blue sub-pixel display data.

(c132), selecting the fourth predetermined quantity of the blue sub-pixel display data from the first predetermined quantity of the blue sub-pixel display data based on each of the third sharable property-values.

(c133), disposing the fourth predetermined quantity of the blue sub-pixel display data to the fourth predetermined quantity of the third data sub-units to generate the third distribution result.

The step (c14) comprises:

(c141), calculating a fourth sharable property-value of each of the white sub-pixel display data.

(c142), selecting the fifth predetermined quantity of the white sub-pixel display data from the first predetermined quantity of the white sub-pixel display data based on each of the fourth sharable property-values.

(c143), disposing the fifth predetermined quantity of the white sub-pixel display data to the fifth predetermined quantity of the fourth data sub-units to generate the fourth distribution result.

An image data processing method, comprising:

(A), receiving a first display data combination. The first display data combination comprises a first predetermined quantity of a first pixel display data. The first pixel display data comprises a red sub-pixel display data, a green sub-pixel display data, and a blue sub-pixel display data.

(B), transforming the first display data combination into a second display data combination. The second display data combination comprises the first predetermined quantity of a second pixel display data. The second pixel display data comprises the red sub-pixel display data, the green sub-pixel display data, the blue sub-pixel display data, and a white sub-pixel display data.

(C), transforming the second display data combination into a third display data combination. The third display data combination comprises the first predetermined quantity of a third pixel display data. The third pixel display data comprises any three of the red sub-pixel display data, the green sub-pixel display data, the blue sub-pixel display data, and a white sub-pixel display data. The third display data combination is used to display a corresponding image by a pixel array.

In the image data processing method mentioned above, the step (B) further comprises:

(b1), generating the second display data combination by adding the white sub-pixel display data into each of the first pixel display data of the first display data combination by a first transforming module.

In the image data processing method mentioned above, the pixel array comprises the first predetermined quantity of pixel units, with at least two of the pixel units lined up along a first direction. Each of the pixel units comprises any three of the red sub-pixels according to the red sub-pixel display data, green sub-pixels according to the green sub-pixel display data, blue sub-pixels according to the blue sub-pixel display data, and white sub-pixels according to the white sub-pixel display data. Any three of the red sub-pixels, the green sub-pixels, the blue sub-pixels, and the white sub-pixels are lined up along the first direction. Along the first direction of the pixel array, at least one green sub-pixel, at least one blue sub-pixel, and at least one white sub-pixel are disposed between any two of the red sub-pixels. At least one red sub-pixel, at least one blue sub-pixel, and at least one white sub-pixel are disposed between any two of the green sub-pixels. At least one green sub-pixel, at least one red sub-pixel, and at least one white sub-pixel are disposed between any two of the blue sub-pixels. At least one green sub-pixel, at least one blue sub-pixel, and at least one red sub-pixel are disposed between any two of the white sub-pixels.

In the image data processing method mentioned above, the step (C) further comprises:

(c1), distributing the red sub-pixel display data, the green sub-pixel display data, the blue sub-pixel display data, and the white sub-pixel display data of the second display data combination to a predetermined data unit to generate a distribution result.

(c2), generating the third display data combination by the distribution result.

The predetermined data unit corresponds to the pixel array, the predetermined unit comprises: a second predetermined quantity of first data sub-units, the first data sub-units correspond to the red sub-pixels; a third predetermined quantity of second data sub-units, the second data sub-units correspond to the green sub-pixels; a fourth predetermined quantity of third data sub-units, the third data sub-units correspond to the blue sub-pixels; a fifth predetermined quantity of fourth data sub-units, the fourth data sub-units correspond to the white sub-pixels. A sum of the second predetermined quantity, the third predetermined quantity, the fourth predetermined quantity, and the fifth predetermined quantity is triple the first predetermined quantity. All of the second predetermined quantity, the third predetermined quantity, the fourth predetermined quantity, and the fifth predetermined quantity are less than the first predetermined quantity.

In the image data processing method mentioned above, the step (c1) comprises:

(c11), distributing the first predetermined quantity of the red sub-pixel display data to the second predetermined quantity of the first data sub-units to generate a first distribution result.

(c12), distributing the first predetermined quantity of the green sub-pixel display data to the third predetermined quantity of the second data sub-units to generate a second distribution result.

(c13), distributing the first predetermined quantity of the blue sub-pixel display data to the fourth predetermined quantity of the third data sub-units to generate a third distribution result.

(c14), distributing the first predetermined quantity of the white sub-pixel display data to the fifth predetermined quantity of the fourth data sub-units to generate a fourth distribution result.

The step (c2) further comprises:

(c21), generating the third display data combination according to the first distribution result, the second distribution result, the third distribution result, and the fourth distribution result.

In the image data processing method mentioned above, the step (c11) comprises: distributing the first predetermined quantity of the red sub-pixel display data to the second predetermined quantity of the first data sub-units with a first predetermined order by a distribution module to generate the first distribution result. The step (c12) comprises: distributing the first predetermined quantity of the green sub-pixel display data to the third predetermined quantity of the second data sub-units with a second predetermined order by the distribution module to generate the second distribution result. The step (c13) comprises: distributing the first predetermined quantity of the blue sub-pixel display data to the fourth predetermined quantity of the third data sub-units with a third predetermined order by the distribution module to generate the third distribution result. The step (c14) comprises: distributing the first predetermined quantity of the white sub-pixel display data to the fifth predetermined quantity of the fourth data sub-units with a fourth predetermined order by the distribution module to generate the fourth distribution result.

In the image data processing method mentioned above, the step (c11) comprises:

(c111), calculating a first sharable property-value of each of the red sub-pixel display data.

(c112), selecting the second predetermined quantity of the red sub-pixel display data from the first predetermined quantity of the red sub-pixel display data based on each of the first sharable property-values.

(c113), disposing the second predetermined quantity of the red sub-pixel display data to the second predetermined quantity of the first data sub-units to generate the first distribution result.

The step (c12) comprises:

(c121), calculating a second sharable property-value of each of the green sub-pixel display data.

(c122), selecting the third predetermined quantity of the green sub-pixel display data from the first predetermined quantity of the green sub-pixel display data based on each of the second sharable property-values.

(c123), disposing the third predetermined quantity of the green sub-pixel display data to the third predetermined quantity of the second data sub-units to generate the second distribution result.

The step (c13) comprises:

(c131), calculating a third sharable property-value of each of the blue sub-pixel display data.

(c132), selecting the fourth predetermined quantity of the blue sub-pixel display data from the first predetermined quantity of the blue sub-pixel display data based on each of the third sharable property-values.

(c133), disposing the fourth predetermined quantity of the blue sub-pixel display data to the fourth predetermined quantity of the third data sub-units to generate the third distribution result.

The step (c14) comprises:

(c141), calculating a fourth sharable property-value of each of the white sub-pixel display data.

(c142), selecting the fifth predetermined quantity of the white sub-pixel display data from the first predetermined quantity of the white sub-pixel display data based on each of the fourth sharable property-values.

(c143), disposing the fifth predetermined quantity of the white sub-pixel display data to the fifth predetermined quantity of the fourth data sub-units to generate the fourth distribution result.

In the image data processing method mentioned above, the step (c111) comprises:

(c1111), calculating a first max value and a first min value of the first predetermined quantity of the red sub-pixel display data by a calculating module.

(c1112), deriving a first difference value between each of the red sub-pixel display data and the first max value by the calculating module, and a second difference value between each of the red sub-pixel display data and the first min value by the calculating module.

(c1113), comparing the first difference value and the second difference value of each of the red sub-pixel display data to generate the first predetermined quantity of a first comparison result by the calculating module.

(c1114), determining the shareability of each of the red sub-pixel display data according to the first predetermined quantity of the first comparison result to generate the first sharable property-values by the calculating module.

The step (c121) comprises:

(c1211), calculating a second max value and a second min value of the first predetermined quantity of the green sub-pixel display data by the calculating module.

(c1212), deriving a third difference value between each of the green sub-pixel display data and the second max value by the calculating module, and a fourth difference value between each of the green sub-pixel display data and the second min value by the calculating module.

(c1213), comparing the third difference value and the fourth difference value of each of the green sub-pixel display data to generate the first predetermined quantity of a second comparison result by the calculating module.

(c1214), determining the shareability of each of the green sub-pixel display data according to the first predetermined quantity of the second comparison result to generate the second sharable property-values by the calculating module.

The step (c131) comprises:

(c1311), calculating a third max value and a third min value of the first predetermined quantity of the blue sub-pixel display data by the calculating module.

(c1312), deriving a fifth difference value between each of the blue sub-pixel display data and the third max value by the calculating module, and a sixth difference value between each of the blue sub-pixel display data and the third min value by the calculating module.

(c1313), comparing the fifth difference value and the sixth difference value of each of the blue sub-pixel display data to generate the first predetermined quantity of a third comparison result by the calculating module.

(c1314), determining the shareability of each of the blue sub-pixel display data according to the first predetermined quantity of the third comparison result to generate the third sharable property-values by the calculating module.

The step (c141) comprises:

(c1411), calculating a fourth max value and a fourth min value of the first predetermined quantity of the white sub-pixel display data by the calculating module.

(c1412), deriving a seventh difference value between each of the white sub-pixel display data and the fourth max value by the calculating module, and an eighth difference value between each of the white sub-pixel display data and the fourth min value by the calculating module.

(c1413), comparing the seventh difference value and the eighth difference value of each of the white sub-pixel display data to generate the first predetermined quantity of a fourth comparison result by the calculating module.

(c1414), determining the shareability of each of the white sub-pixel display data according to the first predetermined quantity of the fourth comparison result to generate the fourth sharable property-values by the calculating module.

An image data processing device, comprising:

A receiving module configured to receive a first display data combination. The first display data combination comprises a first predetermined quantity of a first pixel display data. The first pixel display data comprises a red sub-pixel display data, a green sub-pixel display data, and a blue sub-pixel display data.

A first transforming module configured to transform the first display data combination into a second display data combination. The second display data combination comprises the first predetermined quantity of a second pixel display data. The second pixel display data comprises the red sub-pixel display data, the green sub-pixel display data, the blue sub-pixel display data, and a white sub-pixel display data.

A second transforming module configured to transform the second display data combination into a third display data combination. The third display data combination comprises the first predetermined quantity of a third pixel display data. The third pixel display data comprises any three of the red sub-pixel display data, the green sub-pixel display data, the blue sub-pixel display data, and the white sub-pixel display data. The third display data combination is used to display a corresponding image by the pixel array.

In the image data processing device mentioned above, the first transforming module is further configured to generate the second display data combination by adding the white sub-pixel display data into each of the first pixel display data of the first display data combination.

In the image data processing device mentioned above, the pixel array comprises the first predetermined quantity of pixel units, with at least two of the pixel units lined up along a first direction. Each of the pixel unit comprises any three of the red sub-pixels according to the red sub-pixel display data, green sub-pixels according to the green sub-pixel display data, blue sub-pixels according to the blue sub-pixel display data, and white sub-pixels according to the white sub-pixel display data. Any three of the red sub-pixels, the green sub-pixels, the blue sub-pixels, and the white sub-pixels are lined up along the first direction. Along the first direction of the pixel array, at least one green sub-pixel, at least one blue sub-pixel, and at least one white sub-pixel are disposed between any two of the red sub-pixels, at least one red sub-pixel, at least one blue sub-pixel, and at least one white sub-pixel are disposed between any two of the green sub-pixels, at least one green sub-pixel, at least one red sub-pixel, and at least one white sub-pixel are disposed between any two of the blue sub-pixels, at least one green sub-pixel, at least one blue sub-pixel, and at least one red sub-pixel are disposed between any two of the white sub-pixels.

In the image data processing device mentioned above, the second transforming module comprises:

A distributing module configured to distribute the red sub-pixel display data, the green sub-pixel display data, the blue sub-pixel display data, and the white sub-pixel display data of the second display data combination to a predetermined data unit to generate a distribution result; and a third display data combination generating module configured to generate the third display data combination by the distribution result.

The predetermined data unit corresponds to the pixel array, the predetermined unit comprises: a second predetermined quantity of first data sub-units, the first data sub-units correspond to the red sub-pixels, a third predetermined quantity of second data sub-units, the second data sub-units correspond to the green sub-pixels, a fourth predetermined quantity of third data sub-units, the third data sub-units correspond to the blue sub-pixels, a fifth predetermined quantity of fourth data sub-units, the fourth data sub-units correspond to the white sub-pixels. A sum of the second predetermined quantity, the third predetermined quantity, the fourth predetermined quantity, and the fifth predetermined quantity is triple the first predetermined quantity. All of the second predetermined quantity, the third predetermined quantity, the fourth predetermined quantity, and the fifth predetermined quantity are less than the first predetermined quantity.

In the image data processing device mentioned above, the distributing module is further configured to distribute the first predetermined quantity of the red sub-pixel display data to the second predetermined quantity of the first data sub-units to generate a first distribution result. The distributing module is further configured to distribute the first predetermined quantity of the green sub-pixel display data to the third predetermined quantity of the second data sub-units to generate a second distribution result. The distributing module is further configured to distribute the first predetermined quantity of the blue sub-pixel display data to the fourth predetermined quantity of the third data sub-units to generate a third distribution result. The distributing module is further configured to distribute the first predetermined quantity of the white sub-pixel display data to the fifth predetermined quantity of the fourth data sub-units to generate a fourth distribution result. The third display data combination generating module is further configured to generate the third display data combination according to the first distribution result, the second distribution result, the third distribution result, and the fourth distribution result.

In the image data processing device mentioned above, the distributing module is further configured to distribute the first predetermined quantity of the red sub-pixel display data to the second predetermined quantity of the first data sub-units with a first predetermined order by a distribution module to generate the first distribution result. The distributing module is further configured to distribute the first predetermined quantity of the green sub-pixel display data to the third predetermined quantity of the second data sub-units with a second predetermined order by the distribution module to generate the second distribution result. The distributing module is further configured to distribute the first predetermined quantity of the blue sub-pixel display data to the fourth predetermined quantity of the third data sub-units with a third predetermined order by the distribution module to generate the third distribution result. The distributing module is further configured to distribute the first predetermined quantity of the white sub-pixel display data to the fifth predetermined quantity of the fourth data sub-units with a fourth predetermined order by the distribution module to generate the fourth distribution result.

In the image data processing device mentioned above, the distributing module comprises:

A calculating module configured to calculate a first sharable property-value of each of the red sub-pixel display data, a second sharable property-value of each of the green sub-pixel display data, a third sharable property-value of each of the blue sub-pixel display data, and a fourth sharable property-value of each of the white sub-pixel display data.

A selecting module configured to select the second predetermined quantity of the red sub-pixel display data from the first predetermined quantity of the red sub-pixel display data based on each of the first sharable property-values, the third predetermined quantity of the green sub-pixel display data from the first predetermined quantity of the green sub-pixel display data based on each of the second sharable property-values, the fourth predetermined quantity of the blue sub-pixel display data from the first predetermined quantity of the blue sub-pixel display data based on each of the third sharable property-values, the fifth predetermined quantity of the white sub-pixel display data from the first predetermined quantity of the white sub-pixel display data based on each of the fourth sharable property-values.

A disposing module configured to dispose the second predetermined quantity of the red sub-pixel display data to the second predetermined quantity of the first data sub-units to generate the first distribution result, the third predetermined quantity of the green sub-pixel display data to the third predetermined quantity of the second data sub-units to generate the second distribution result, the fourth predetermined quantity of the blue sub-pixel display data to the fourth predetermined quantity of the third data sub-units to generate the third distribution result, and the fifth predetermined quantity of the white sub-pixel display data to the fifth predetermined quantity of the fourth data sub-units to generate the fourth distribution result.

In the image data processing device mentioned above, the calculating module is further configured to calculate a first max value and a first min value of the first predetermined quantity of the red sub-pixel display data to derive a first difference value between each of the red sub-pixel display data and the first max value, and a second difference value between each of the red sub-pixel display data and the first min value, to compare the first difference value and the second difference value of each of the red sub-pixel display data to generate the first predetermined quantity of a first comparison result, and thereby to determine the shareability of each of the red sub-pixel display data according to the first predetermined quantity of the first comparison result to generate the first sharable property-values.

The calculating module is further configured to calculate a second max value and a second min value of the first predetermined quantity of the green sub-pixel display data, to derive a third difference value between each of the green sub-pixel display data and the second max value, and a fourth difference value between each of the green sub-pixel display data and the second min value, to compare the third difference value and the fourth difference value of each of the green sub-pixel display data to generate the first predetermined quantity of a second comparison result, and thereby to determine the shareability of each of the green sub-pixel display data according to the first predetermined quantity of the second comparison result to generate the second sharable property-values.

The calculating module is further configured to calculate a third max value and a third min value of the first predetermined quantity of the blue sub-pixel display data, to derive a fifth difference value between each of the blue sub-pixel display data and the third max value, and a sixth difference value between each of the blue sub-pixel display data and the third min value, to compare the fifth difference value and the sixth difference value of each of the blue sub-pixel display data to generate the first predetermined quantity of a third comparison result, and thereby to determine the shareability of each of the blue sub-pixel display data according to the first predetermined quantity of the third comparison result to generate the third sharable property-values.

The calculating module is further configured to calculate a fourth max value and a fourth min value of the first predetermined quantity of the white sub-pixel display data, to derive a seventh difference value between each of the white sub-pixel display data and the fourth max value, and an eighth difference value between each of the white sub-pixel display data and the fourth min value, to compare the seventh difference value and the eighth difference value of each of the white sub-pixel display data to generate the first predetermined quantity of a fourth comparison result, and thereby to determine the shareability of each of the white sub-pixel display data according to the first predetermined quantity of the fourth comparison result to generate the fourth sharable property-values.

With comparison with the prior art, the present invention is able to raise image contrast while effectively keeping the resolution rate, color tone, and color saturation of an original image without adding any hardware with two columns of cache to eliminate or effectively decrease phenomenon inconsistent with the original image, phenomenon such as color edges, fuzzy edges, or even errors. Meanwhile, the calculation is less complicated and easy to implement in any hardware.

To allow the present invention to be more clearly understood, preferred embodiments are given below, and accompanied with drawings, and are described in detail as follows:

DETAILED DESCRIPTION OF THE PREFERRED EMBODIMENTS

Regarding the terms used in this specification, "an embodiment" means serving as an example, a sample, or an illustration. In this specification and the appended claims the article "a" can generally be interpreted to mean "one or more" unless specified otherwise or clearly oriented to singular form from the context.

Figure 1:
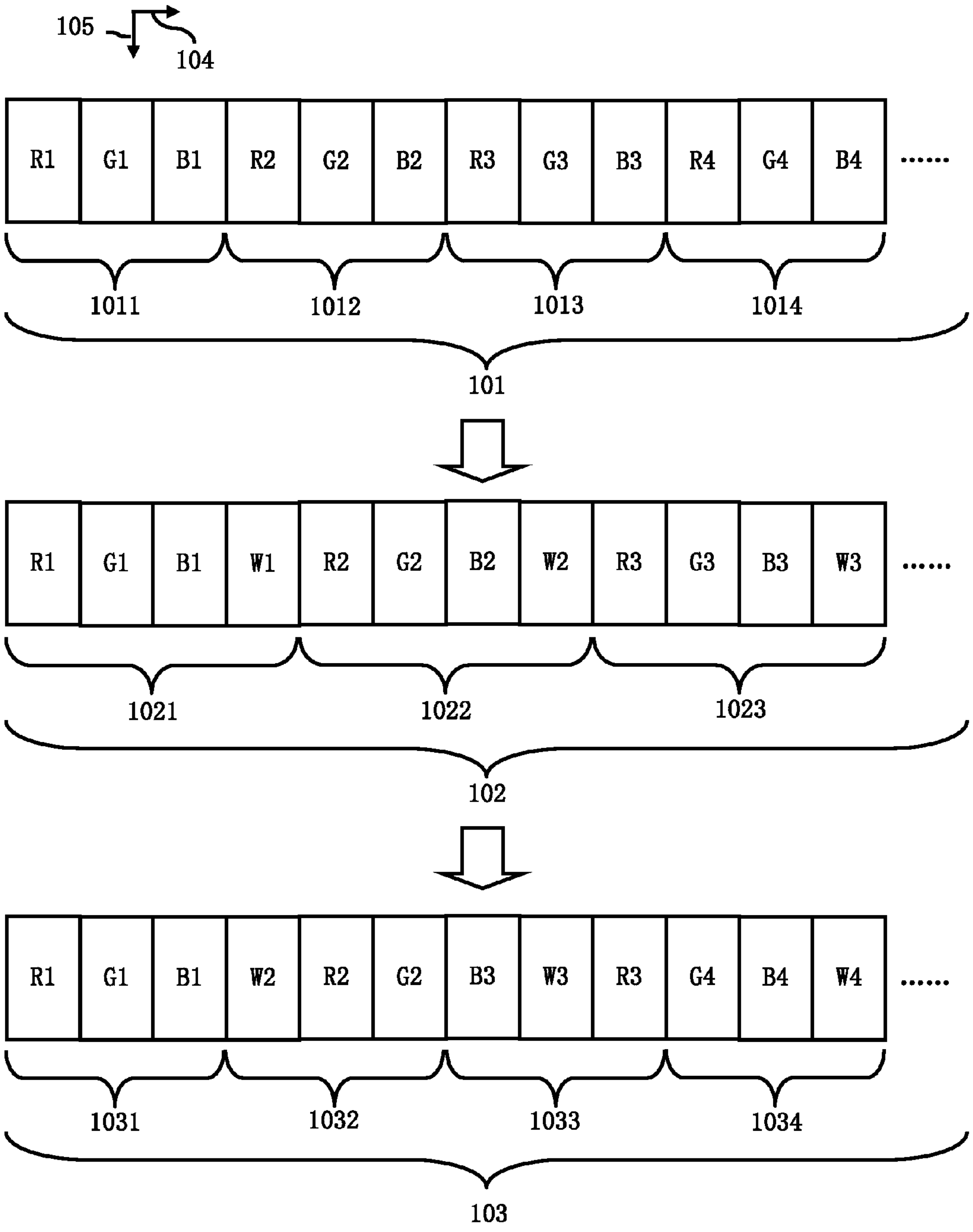
FIG. 1 is a diagram of a process applied on image data by an image data processing device and method of the present invention.
Figure 2:
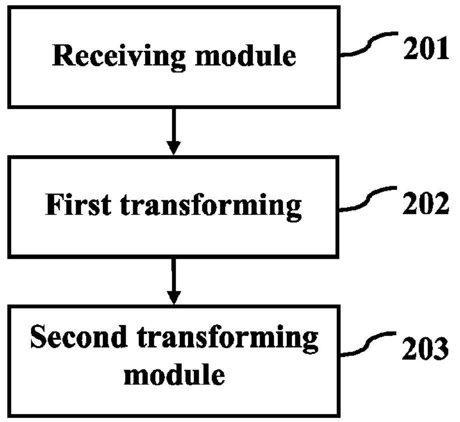
FIG. 2 shows a block diagram of the image data processing device of the present invention.

FIG. 1 is a diagram of a process applied on image data by an image data processing device and method of the present invention. FIG. 2 shows a block diagram of the image data processing device of the present invention.

In the preferred embodiment, an image data processing device comprises a receiving module 201, a first transforming module 202, and a second transforming module 203.

The receiving module 201 configured to receive a first display data combination 101, the first display data combination comprises a first predetermined quantity of a first pixel display data (1011, 1012, 1013, 1014), the first pixel display data (1011, 1012, 1013, 1014) comprises a red sub-pixel display data (R1, R2, R3, R4), a green sub-pixel display data (G1, G2, G3, G4), and a blue sub-pixel display data (B1, B2, B3, B4). The first pixels according to at least two of the first pixel display data (1011, 1012, 1013, 1014) are lined up along a first direction 104 in an array formation. The red sub-pixels according to the red sub-pixel display data (R1, R2, R3, R4), the green sub-pixels according to the green sub-pixel display data (G1, G2, G3, G4), and the blue sub-pixels according to the blue sub-pixel display data (B1, B2, B3, B4) line up along the first direction 104 in an array formation.

The first transforming module 202 is configured to transform the first display data combination 101 into a second display data combination 102. The second display data combination 102 comprises the first predetermined quantity of a second pixel display data (1021, 1022, 1023). The second pixel display data (1021, 1022, 1023) comprises the red sub-pixel display data (R1, R2, R3, R4), the green sub-pixel display data (G1, G2, G3, G4), the blue sub-pixel display data (B1, B2, B3, B4), and a white sub-pixel display data (W1, W2, W3, W4). The second pixels according to at least two of the second pixel display data (1021, 1022, 1023) are lined up along a first direction 104 in an array formation. The red sub-pixels according to the red sub-pixel display data (R1, R2, R3, R4), the green sub-pixels according to the green sub-pixel display data (G1, G2, G3, G4), the blue sub-pixels according to the blue sub-pixel display data (B1, B2, B3, B4), and the white sub-pixels according to the white sub-pixel display data (W1, W2, W3, W4) line up along the first direction 104 in an array formation. The first transforming module 202 transforms the first display data combination 101 (RGB format) into a data (RGBW format) by HSV (Hue Saturation Value) color enforcement calculation, and performs color regulation to the data (RGBW format) to generate the second display data combination 102.

The second transforming module 203 is configured to transform the second display data combination 102 into a third display data combination 103. The third display data combination 103 comprises the first predetermined quantity of a third pixel display data (1031, 1032, 1033, 1034). The third pixel display data (1031, 1032, 1033, 1034) comprises any three of the red sub-pixel display data (R1, R2, R3, R4), the green sub-pixel display data (G1, G2, G3, G4), the blue sub-pixel display data (B1, B2, B3, B4), and a white sub-pixel display data (W1, W2, W3, W4), the third display data combination 103 is used to display a corresponding image by a pixel array.

In the image data processing device of the preferred embodiment, the pixel array comprises the first predetermined quantity of pixel units, with at least two of the pixel units lined up along a first direction 104. In order to clearly describe the preferred embodiment, the pixel array is a 1-dimensional array. In other words, the pixel array is composed of the first predetermined quantity of pixel units which are lined up in one dimension (the first direction 104). In practice, the pixel array can be a 2-dimensional array. The 2-dimensional array is composed of a plurality of the 1-dimensional arrays lined up on a second direction 105. The first direction 104 and the second direction 105 are perpendicular to each other. As for a 2-dimensional array, the multiple 1-dimensional arrays lined up on the second direction 105 need to be executed method/steps similar to those applied to the 1-dimensional array.

The pixel unit comprises any three of red sub-pixels according to the red sub-pixel display data (R1, R2, R3, R4), green sub-pixels according to the green sub-pixel display data (G1, G2, G3, G4), blue sub-pixels according to the blue sub-pixel display data (B1, B2, B3, B4), and the white sub-pixels according to the white sub-pixel display data (W1, W2, W3, W4), any three of the red sub-pixels, the green sub-pixels, the blue sub-pixels, and the white sub-pixels lined up along the first direction 104.

Along the first direction 104 of the pixel array, at least one green sub-pixel, at least one blue sub-pixel, and at least one white sub-pixel are disposed between any two of the red sub-pixels; at least one red sub-pixel, at least one blue sub-pixel, and at least one white sub-pixel are disposed between any two of the green sub-pixels; at least one green sub-pixel, at least one red sub-pixel, and at least one white sub-pixel are disposed between any two of the blue sub-pixels; and at least one green sub-pixel, at least one blue sub-pixel, and at least one red sub-pixel are disposed between any two of the white sub-pixels.

In the image data processing device of the preferred embodiment, the first transforming module 202 is further configured to generate the second display data combination 102 by adding the white sub-pixel display data (W1, W2, W3, W4) into each of the first pixel display data (1011, 1012, 1013, 1014) of the first display data combination 101.

Figure 3:
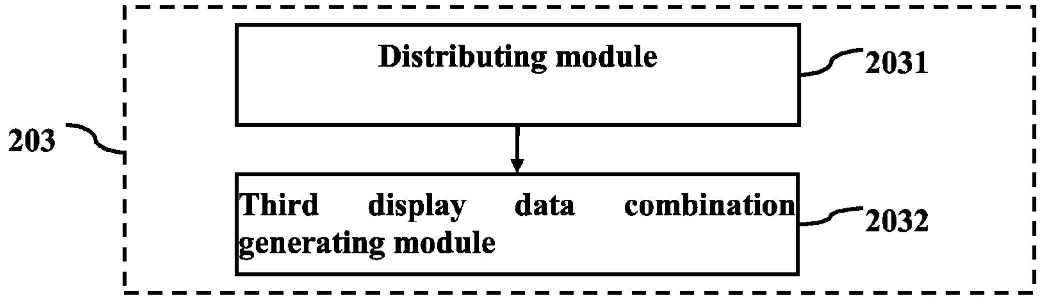
FIG. 3 shows a block diagram of the second transforming module of FIG. 2.

FIG. 3 shows a block diagram of the second transforming module of FIG. 2.

In the image data processing device of the preferred embodiment, the second transforming module 203 comprises a distributing module 2031 and a third display data combination 103 generating module 2032.

The distributing module 2031 is configured to distribute the red sub-pixel display data (R1, R2, R3, R4), the green sub-pixel display data (G1, G2, G3, G4), the blue sub-pixel display data (B1, B2, B3, B4), and a white sub-pixel display data (W1, W2, W3, W4) of the second display data combination 102 to a predetermined data unit to generate a distribution result.

The third display data combination 103 generating module 2032 generates the third display data combination 103 by the distribution result.

The predetermined data unit corresponds to the pixel array, the predetermined unit comprises: a second predetermined quantity of first data sub-units, a third predetermined quantity of second data sub-units, a fourth predetermined quantity of third data sub-units, and a fifth predetermined quantity of fourth data sub-units.

The first data sub-units correspond to the red sub-pixels, the second data sub-units correspond to the green sub-pixels, the third data sub-units correspond to the blue sub-pixels, and the fourth data sub-units correspond to the white sub-pixels.

A sum of the second predetermined quantity, the third predetermined quantity, the fourth predetermined quantity, and the fifth predetermined quantity is triple the first predetermined quantity. All of the second predetermined quantity, the third predetermined quantity, the fourth predetermined quantity, and the fifth predetermined quantity are less than the first predetermined quantity.

In the image data processing device of the preferred embodiment, the distributing module 2031 is further configured to distribute the first predetermined quantity of the red sub-pixel display data (R1, R2, R3, R4) to the second predetermined quantity of the first data sub-units to generate a first distribution result. The distributing module is further configured to distribute the first predetermined quantity of the green sub-pixel display data (G1, G2, G3, G4) to the third predetermined quantity of the second data sub-units to generate a second distribution result. The distributing module is further configured to distribute the first predetermined quantity of the blue sub-pixel display data (B1, B2, B3, B4) to the fourth predetermined quantity of the third data sub-units to generate a third distribution result. The distributing module is further configured to distribute the first predetermined quantity of the white sub-pixel display data (W1, W2, W3, W4) to the fifth predetermined quantity of the fourth data sub-units to generate a fourth distribution result. The third display data combination 103 generating module 2032 is further configured to generate the third display data combination 103 according to the first distribution result, the second distribution result, the third distribution result, and the fourth distribution result.

Figure 4:
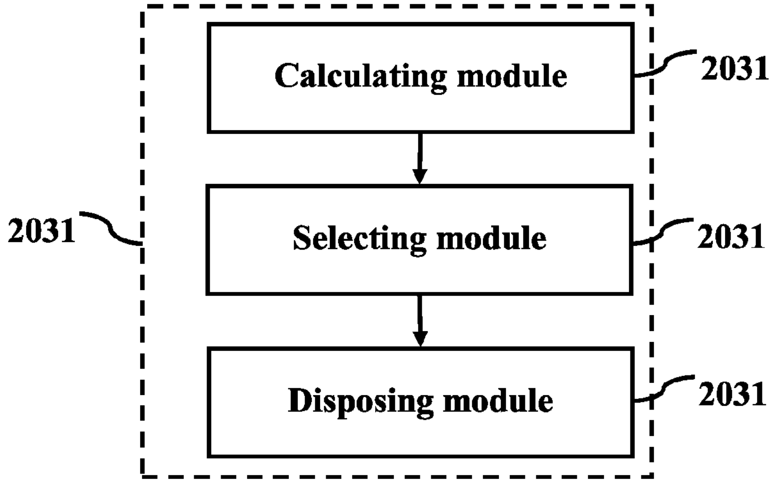
FIG. 4 shows a block diagram of the distributing module of FIG. 3.

FIG. 4 shows a block diagram of the distributing module 2031 of FIG. 3.

In the image data processing device of the preferred embodiment, the distributing module 2031 comprises a calculating module 20311, a selecting module 20312, and a disposing module 20313.

The calculating module 20311 is configured to calculate a first sharable property-value of each of the red sub-pixel display data (R1, R2, R3, R4), a second sharable property-value of each of the green sub-pixel display data (G1, G2, G3, G4), a third sharable property-value of each of the blue sub-pixel display data (B1, B2, B3, B4), and a fourth sharable property-value of each of the white sub-pixel display data (W1, W2, W3, W4).

The selecting module 20312 is configured to select the second predetermined quantity of the red sub-pixel display data (R1, R2, R3, . . . ) from the first predetermined quantity of the red sub-pixel display data (R1, R2, R3, R4) based on each of the first sharable property-values, the third predetermined quantity of the green sub-pixel display data (G1, G2, G4, . . . ) from the first predetermined quantity of the green sub-pixel display data (G1, G2, G3, G4) based on each of the second sharable property-values, the fourth predetermined quantity of the blue sub-pixel display data (B1, B3, B4, . . . ) from the first predetermined quantity of the blue sub-pixel display data (B1, B2, B3, B4) based on each of the third sharable property-values, and the fifth predetermined quantity of the white sub-pixel display data (W2, W3, W4, . . . ) from the first predetermined quantity of the white sub-pixel display data (W1, W2, W3, W4) based on each of the fourth sharable property-values.

The disposing module 20313 is configured to dispose the second predetermined quantity of the red sub-pixel display data (R1, R2, R3, . . . ) to the second predetermined quantity of the first data sub-units to generate the first distribution result, the third predetermined quantity of the green sub-pixel display data (G1, G2, G4, . . . ) to the third predetermined quantity of the second data sub-units to generate the second distribution result, the fourth predetermined quantity of the blue sub-pixel display data (B1, B3, B4, . . . ) to the fourth predetermined quantity of the third data sub-units to generate the third distribution result, and the fifth predetermined quantity of the white sub-pixel display data (W2, W3, W4, . . . ) to the fifth predetermined quantity of the fourth data sub-units to generate the fourth distribution result.

In the image data processing device of the preferred embodiment, the calculating module 20311 is further configured to calculate a first max value and a first min value of the first predetermined quantity of the red sub-pixel display data (R1, R2, R3, R4) to derive a first difference value between each of the red sub-pixel display data (R1, R2, R3, R4) and the first max value, and a second difference value between each of the red sub-pixel display data (R1, R2, R3, R4) and the first min value, to compare the first difference value and the second difference value of each of the red sub-pixel display data to generate the first predetermined quantity of a first comparison result, and thereby to determine the shareability of each of the red sub-pixel display data (R1, R2, R3, R4) according to the first predetermined quantity of the first comparison result to generate the first sharable property-values.

The calculating module 20311 is further configured to calculate a second max value and a second min value of the first predetermined quantity of the green sub-pixel display data (G1, G2, G3, G4) to derive a third difference value between each of the green sub-pixel display data (G1, G2, G3, G4) and the second max value, and a fourth difference value between each of the green sub-pixel display data (G1, G2, G3, G4) and the second min value to compare the third difference value and the fourth difference value of each of the green sub-pixel display data (G1, G2, G3, G4) to generate the first predetermined quantity of a second comparison result, and thereby to determine the shareability of each of the green sub-pixel display data (G1, G2, G3, G4) according to the first predetermined quantity of the second comparison result to generate the second sharable property-values.

The calculating module 20311 is further configured to calculate a third max value and a third min value of the first predetermined quantity of the blue sub-pixel display data (B1, B2, B3, B4) to derive a fifth difference value between each of the blue sub-pixel display data (B1, B2, B3, B4) and the third max value, and a sixth difference value between each of the blue sub-pixel display data (B1, B2, B3, B4) and the third min value to compare the fifth difference value and the sixth difference value of each of the blue sub-pixel display data to generate the first predetermined quantity of a third comparison result, and thereby to determine the shareability of each of the blue sub-pixel display data (B1, B2, B3, B4) according to the first predetermined quantity of the third comparison result to generate the third sharable property-values.

The calculating module 20311 is further configured to calculate a fourth max value and a fourth min value of the first predetermined quantity of the white sub-pixel display data (W1, W2, W3, W4) to derive a seventh difference value between each of the white sub-pixel display data (W1, W2, W3, W4) and the fourth max value, and an eighth difference value between each of the white sub-pixel display data (W1, W2, W3, W4) and the fourth min value to compare the seventh difference value and the eighth difference value of each of the white sub-pixel display data (W1, W2, W3, W4) to generate the first predetermined quantity of a fourth comparison result, and thereby to determine the shareability of each of the white sub-pixel display data according to the first predetermined quantity of the fourth comparison result to generate the fourth sharable property-values.

Regarding the image data processing device and method of the present invention, take the blue sub-pixels display data as a reference for description as below:

The calculating module 20311 individually derives four (five, six, and seven . . . ) of the blue sub-pixels display data (B1, B2, B3, B4).

The calculating module 20311 individually derives a gray max value (the second max value) and a gray min value (the second min value) from four (five, six, and seven . . . ) blue sub-pixel display data (B1, B2, B3, B4) of the first predetermined quantity of the second pixel display data (1021, 1022, 1023). For example, the calculating module 20311 can calculate the gray max value and the gray min value according to formulas below:

$$\text{The gray max value MAX}=\max(\max(\max(B1,B2),B3),B4).$$

$$\text{The gray min value MIN}=\min(\min(\min(B1,B2),B3),B4).$$

The calculating module 20311 individually derives a difference value (the third difference value) between the four blue sub-pixel display data (B1, B2, B3, B4) and the gray max value, another difference value (the fourth difference value) between the four blue sub-pixel display data (B1, B2, B3, B4) and the gray min value.

For example, the calculating module 20311 can calculate the difference values (the fifth difference value, the sixth difference value) according to formulas below:

$$\text{The third difference value } A1=ABS(B1-\text{MAX}),\text{ the fourth difference value } A2=ABS(B1-\text{MIN}).$$

$$\text{The third difference value } B1=ABS(B2-\text{MAX}),\text{ the fourth difference value } B2=ABS(B2-\text{MIN}).$$

$$\text{The third difference value } C1=ABS(B3-\text{MAX}),\text{ the fourth difference value } C2=ABS(B3-\text{MIN}).$$

$$\text{The third difference value } D1=ABS(B4-\text{MAX}),\text{ the fourth difference value } D2=ABS(B4-\text{MIN}).$$

The selecting module 20312 determines which sub-pixel to output by the characteristics and weighting of the four blue sub-pixel display data (B1, B2, B3, B4).

The calculating module 20311 calculates the weighting of each sub-pixel by the gray max value (max length) and the gray min value (min length) derived from the above formulas. The weighting of the four blue sub-pixel display data (B1, B2, B3, B4) is derived as below:

The calculating module 20311 defines four variances: a first variance a, a second variance b, a third variance c, and a fourth variance d. If the third difference value A1≥the fourth difference value A2, then the first variance a=0. In other words, the blue sub-pixel display data B1 is much closer to the gray min value (less value difference); otherwise, the first variance a=1. In other words, the blue sub-pixel display data B1 is much closer to the gray max value (less value difference). In summary, the first variance a, is used to represent the length difference (value difference) between the blue sub-pixel display data B1 to the gray max value and to the gray min value.

As stated above, the second variance b, the third variance c, and the fourth variance d are used to individually represent the length difference of the blue sub-pixel display data B2, B3, B4 to the gray min value and to the gray min value.

Based on the first variance a, the second variance b, the third variance c, and the fourth variance d, the calculating module 20311 can derive the weighting of the four blue sub-pixel display data (B1, B2, B3, B4).

Figure 5:
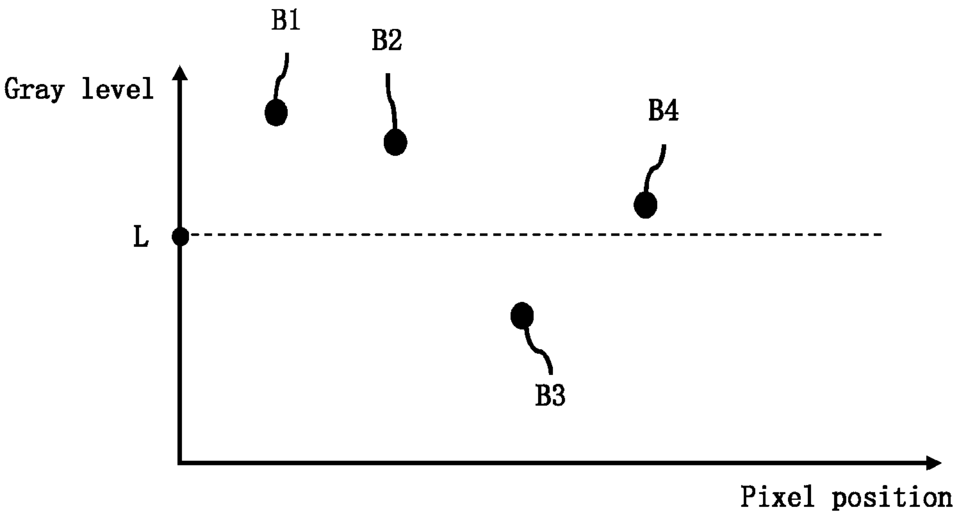
FIG. 5 shows an illustrative diagram of a first preferred embodiment of the shareability of the sub-pixel display data generated by the calculating module of FIG. 4.

As shown in FIG. 5, a dashed line L represents a mean value of the gray max value and the gray min value of the four blue sub-pixel display data (B1, B2, B3, B4). In other words, the value of L=½ (the gray max value+the gray min value). When a=b=d=1, c=0, it is easy to derive a conclusion that the blue sub-pixel display data (B1, B2, B4) are close to the gray max value and the blue sub-pixel display data (B3) is close to the gray min value. The blue sub-pixel display data (B1, B2, B4) are over the dashed line L, the blue sub-pixel display data (B3) is under the dashed line L, the blue sub-pixel display data (B1) is the gray max value, and the blue sub-pixel display data (B3) is the gray min value.

Because B2 is close to B1, B1 can better reserve the characteristic of B2. In other words, B1 and B2 have similar characteristics; B2 can be derived by sharing B1. Because B3 is under the dashed line L, in other words, B3 is relatively far from B1, B2 and B4, the characteristic of B3 is relatively apparent, and B3 needs to be reserved.

Hence, B1 and B3 are relative unique to each other, which needs to be reserved; B2 can be shared with B1, in other words, B2 can be replaced by B1. B1, B2, B3, B4 can be replaced by B1, B3, B4, in other words, the selecting module 20312 selects B1, B3, B4 from B1, B2, B3, B4.

Figure 6:
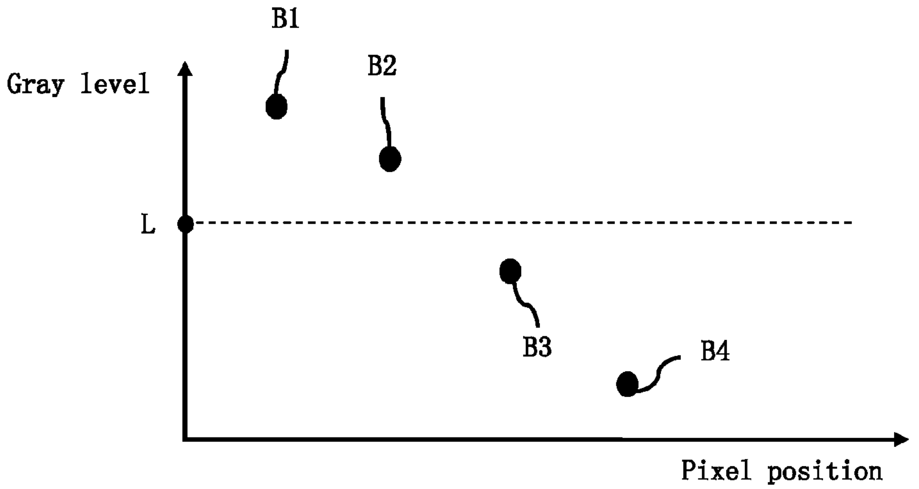
FIG. 6 shows an illustrative diagram of a second preferred embodiment of the shareability of the sub-pixel display data generated by the calculating module of FIG. 4.

As shown in FIG. 6, when a=b=1, c=d=0, relative to the dashed line L, B2 is close to B1 (MAX); in other words, B1 can better show the characteristic of B2. In other words, B2 can be replaced by sharing B1. However, B3 is relatively far from B4, which B3 and B4 are relative unique, and B3 needs to be reserved as the sharing pixel of the pixel 3. Hence, B1, B2, B3, B4 can be replaced by B1, B3, B4. In other words, the selecting module 20312 selects B1, B3, B4 from B1, B2, B3, B4.

Figure 7:
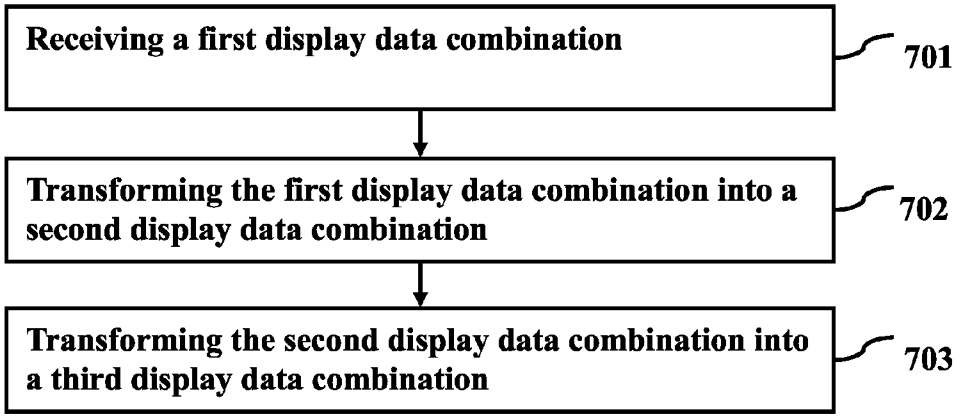
FIG. 7 shows a flow diagram of the image data processing method of the present invention.

FIG. 7 shows a flow diagram of the image data processing method of the present invention.

The image data processing method of the preferred embodiment comprises the following steps:

(A) 701, a receiving module 201 is configured to receive a first display data combination 101, the first display data combination 101 comprises a first predetermined quantity of a first pixel display data (1011, 1012, 1013, 1014), the first pixel display data (1011, 1012, 1013, 1014) comprises a red sub-pixel display data (R1, R2, R3, R4), a green sub-pixel display data (G1, G2, G3, G4), and a blue sub-pixel display data (B1, B2, B3, B4).

(B) 702, a first transforming module 202 is configured to transform the first display data combination 101 into a second display data combination 102, the second display data combination 102 comprises the first predetermined quantity of a second pixel display data (1021, 1022, 1023), the second pixel display data (1021, 1022, 1023) comprises the red sub-pixel display data (R1, R2, R3, R4), the green sub-pixel display data (G1, G2, G3, G4), the blue sub-pixel display data (B1, B2, B3, B4), and a white sub-pixel display data (W1, W2, W3, W4).

(C) 703, a second transforming module 203 is configured to transform the second display data combination 102 into a third display data combination 103, the third display data combination 103 comprises the first predetermined quantity of a third pixel display data (1031, 1032, 1033, 1034), the third pixel display data (1031, 1032, 1033, 1034) comprises any three of the red sub-pixel display data (R1, R2, R3, R4), the green sub-pixel display data (G1, G2, G3, G4), the blue sub-pixel display data (B1, B2, B3, B4), and a white sub-pixel display data (W1, W2, W3, W4). The third display data combination 103 is used to display a corresponding image by a pixel array.

In the image data processing method of the preferred embodiment, the pixel array comprises the first predetermined quantity of pixel units, at least two of the pixel units lined up along a first direction 104. In order to clearly describe the preferred embodiment, the pixel array is a 1-dimensional array. In other words, the pixel array is composed of the first predetermined quantity of pixel units which are lined up on one dimension (the first direction 104). In practice, the pixel array can be a 2-dimensional array. The 2-dimensional array is composed of a plurality of the 1-dimensional arrays lined up in a second direction 105. The first direction 104 and the second direction 105 are perpendicular to each other. As for 2-dimensional array, the multiple 1-dimensional arrays lined up on the second direction 105 need to be executed in method/steps similar to those applied to the 1-dimensional array.

The pixel unit comprises any three of the red sub-pixels according to the red sub-pixel display data (R1, R2, R3, R4), green sub-pixels according to the green sub-pixel display data (G1, G2, G3, G4), blue sub-pixels according to the blue sub-pixel display data (B1, B2, B3, B4), and the white sub-pixels according to the white sub-pixel display data (W1, W2, W3, W4), any three of the red sub-pixels, the green sub-pixels, the blue sub-pixels, and the white sub-pixels lined up along the first direction 104.

Along the first direction 104 of the pixel array, at least one green sub-pixel, at least one blue sub-pixel, and at least one white sub-pixel are disposed between any two of the red sub-pixels; at least one red sub-pixel, at least one blue sub-pixel, and at least one white sub-pixel are disposed between any two of the green sub-pixels; at least one green sub-pixel, at least one red sub-pixel, and at least one white sub-pixel are disposed between any two of the blue sub-pixels; and at least one green sub-pixel, at least one blue sub-pixel, and at least one red sub-pixel are disposed between any two of the white sub-pixels.

In the image data processing method of the preferred embodiment, (B) comprises:

(b1), the first transforming module 202 is further configured to generate the second display data combination 102 by adding the white sub-pixel display data (W1, W2, W3, W4) into each of the first pixel display data (1011, 1012, 1013, 1014) of the first display data combination 101.

Figure 8:
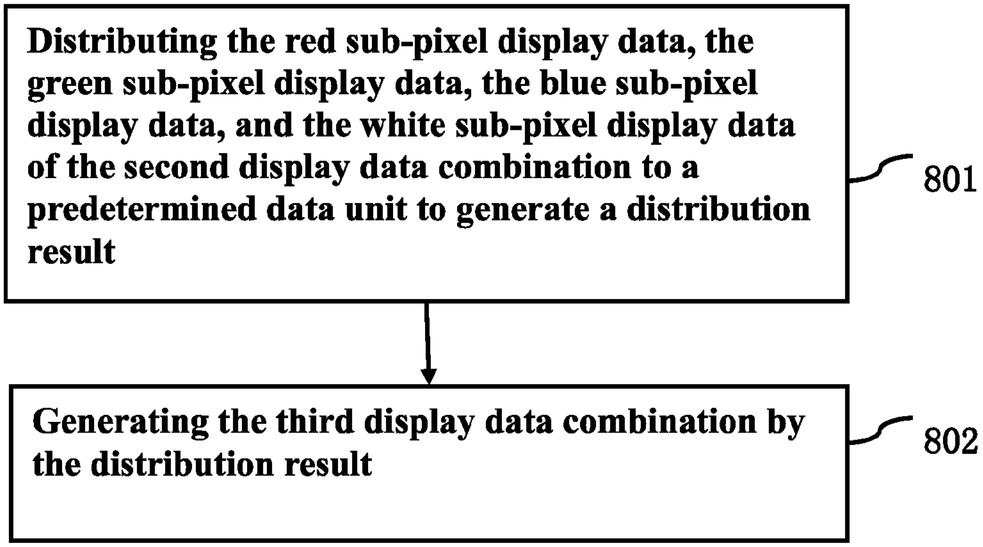
FIGS. 8, 9 and 10 show flow diagrams of the steps of transforming the second display data combination to the third display data combination of FIG. 7.
Figure 9:
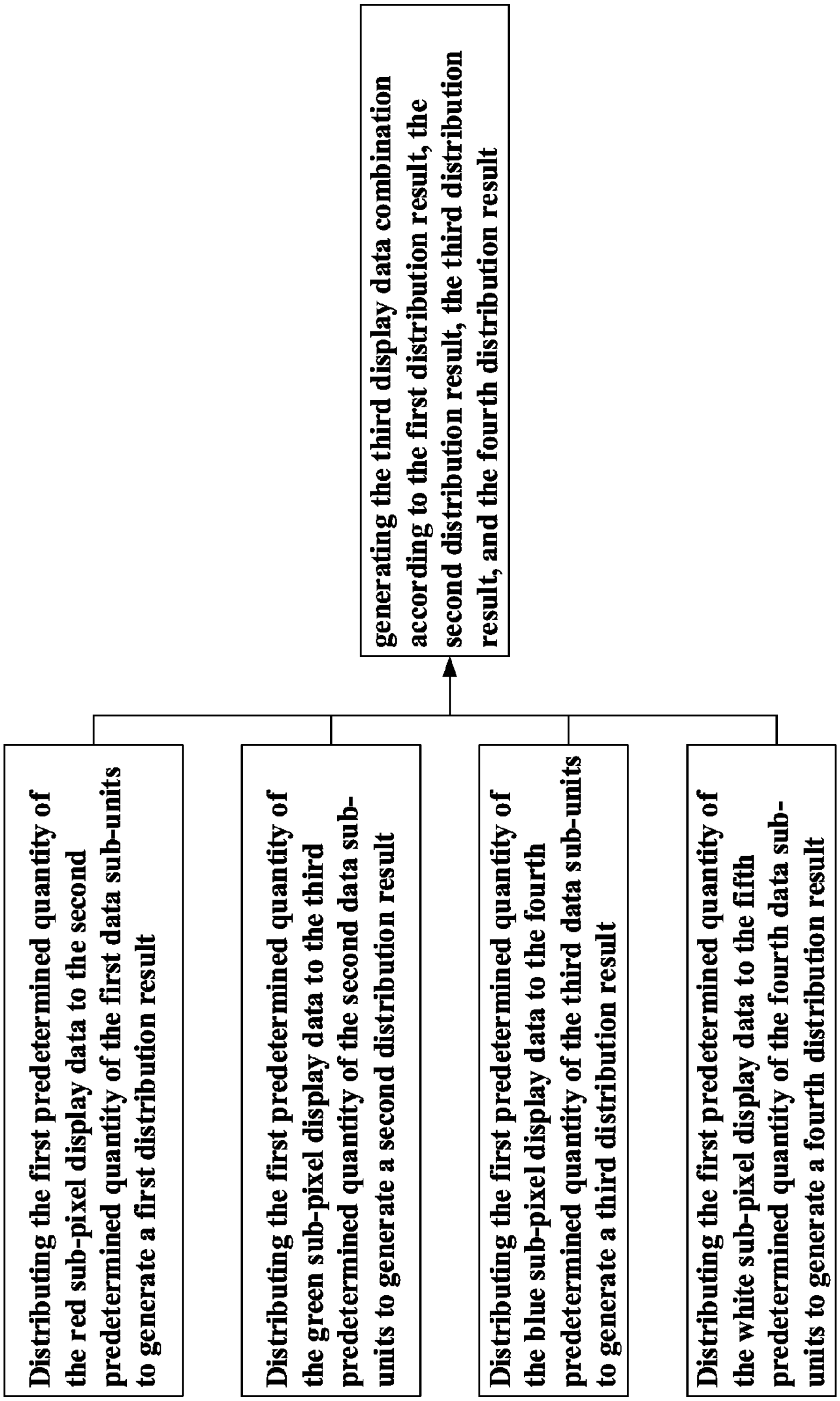
Figure 10:
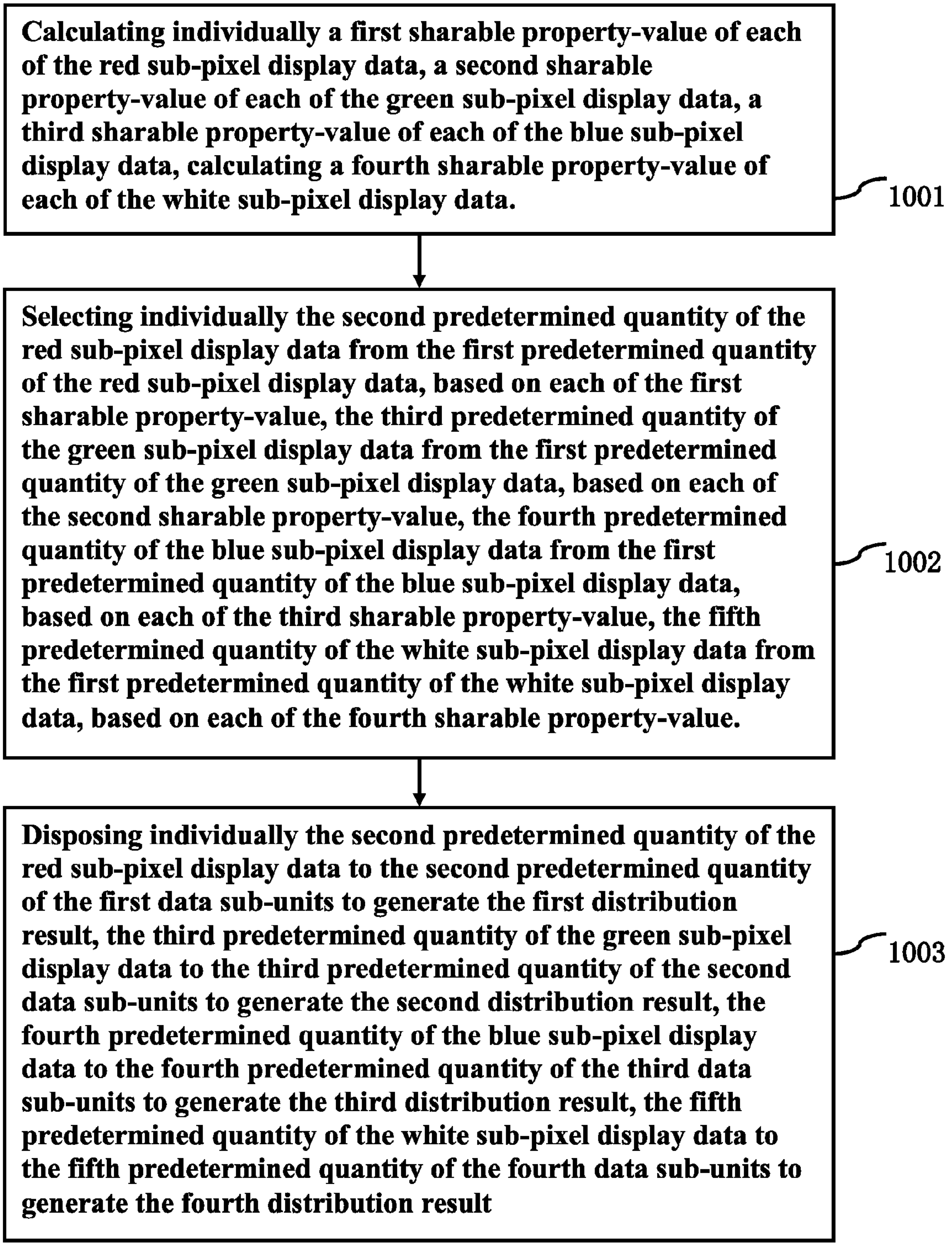

FIGS. 8, 9 and 10 show flow diagrams of steps of transforming the second display data combination to the third display data combination of FIG. 7.

In the image data processing method of the preferred embodiment, (C) comprises:

(c1) 801, the distributing module 2031 is configured to distribute the red sub-pixel display data (R1, R2, R3, R4), the green sub-pixel display data (G1, G2, G3, G4), the blue sub-pixel display data (B1, B2, B3, B4), and a white sub-pixel display data (W1, W2, W3, W4) of the second display data combination 102 to a predetermined data unit to generate a distribution result.

(c2) 802, the third display data combination 103 generating module 2032 generates the third display data combination 103 by the distribution result.

The predetermined data unit corresponds to the pixel array, the predetermined unit comprising:

A second predetermined quantity of first data sub-units, the first data sub-units correspond to the red sub-pixels.

A third predetermined quantity of second data sub-units, the second data sub-units correspond to the green sub-pixels.

A fourth predetermined quantity of third data sub-units, the third data sub-units correspond to the blue sub-pixels.

A fifth predetermined quantity of fourth data sub-units, the fourth data sub-units correspond to the white sub-pixels.

A sum of the second predetermined quantity, the third predetermined quantity, the fourth predetermined quantity, and the fifth predetermined quantity is triple the first predetermined quantity, all of the second predetermined quantity, the third predetermined quantity, the fourth predetermined quantity, and the fifth predetermined quantity are less than the first predetermined quantity.

In the image data processing method of the preferred embodiment, (c1) comprises:

(c11) 901, the distributing module 2031 is further configured to distribute the first predetermined quantity of the red sub-pixel display data (R1, R2, R3, R4) to the second predetermined quantity of the first data sub-units to generate a first distribution result.

(c12) 902, the distributing module is further configured to distribute the first predetermined quantity of the green sub-pixel display data (G1, G2, G3, G4) to the third predetermined quantity of the second data sub-units to generate a second distribution result.

(c13) 903, the distributing module is further configured to distribute the first predetermined quantity of the blue sub-pixel display data (B1, B2, B3, B4) to the fourth predetermined quantity of the third data sub-units to generate a third distribution result.

(c14) 904, the distributing module is further configured to distribute the first predetermined quantity of the white sub-pixel display data (W1, W2, W3, W4) to the fifth predetermined quantity of the fourth data sub-units to generate a fourth distribution result.

(c2) 802 comprises:

(c21) 905, the third display combination 103 generating module 2032 is configured to generate the third display data combination 103 according to the first distribution result, the second distribution result, the third distribution result, and the fourth distribution result.

In the image data processing method of the preferred embodiment, (c11) comprises:

(c111) 1001, the calculating module 20311 is configured to calculate a first sharable property-value of each of the red sub-pixel display data (R1, R2, R3, R4).

(c112) 1002, the selecting module 20312 is configured to select the second predetermined quantity of the red sub-pixel display data (R1, R2, R3, . . . ) from the first predetermined quantity of the red sub-pixel display data (R1, R2, R3, R4) based on each of the first sharable property-values.

(c113) 1003, the disposing module 20313 is configured to dispose the second predetermined quantity of the red sub-pixel display data (R1, R2, R3, . . . ) to the second predetermined quantity of the first data sub-units to generate the first distribution result.

(c12) comprises:

(c121) 1001, the calculating module 20311 is configured to calculate a second sharable property-value of each of the green sub-pixel display data (G1, G2, G3, G4).

(c122) 1002, the selecting module 20312 is configured to select the third predetermined quantity of the green sub-pixel display data (G1, G2, G4, . . . ) from the first predetermined quantity of the green sub-pixel display data (G1, G2, G3, G4) based on each of the second sharable property-values.

(c123) 1003, the disposing module 20313 is configured to dispose the third predetermined quantity of the green sub-pixel display data (G1, G2, G4, . . . ) to the third predetermined quantity of the second data sub-units to generate the second distribution result.

(c13) comprises:

(c131) 1001, the calculating module 20311 is configured to calculate a third sharable property-value of each of the blue sub-pixel display data (B1, B2, B3, B4).

(c132) 1002, the selecting module 20312 is configured to select the fourth predetermined quantity of the blue sub-pixel display data (B1, B3, B4, . . . ) from the first predetermined quantity of the blue sub-pixel display data (B1, B2, B3, B4) based on each of the third sharable property-values.

(c133) 1003, the disposing module 20313 is configured to dispose the fourth predetermined quantity of the blue sub-pixel display data (B1, B3, B4, . . . ) to the fourth predetermined quantity of the third data sub-units to generate the third distribution result.

(c14) comprises:

(c141) 1001, the calculating module 20311 is configured to calculate a fourth sharable property-value of each of the white sub-pixel display data (W1, W2, W3, W4).

(c142) 1002, the selecting module 20312 is configured to select the fifth predetermined quantity of the white sub-pixel display data (W2, W3, W4, . . . ) from the first predetermined quantity of the white sub-pixel display data (W1, W2, W3, W4) based on each of the fourth sharable property-values.

(c143) 1003, the disposing module 20313 is configured to dispose the fifth predetermined quantity of the white sub-pixel display data (W2, W3, W4, . . . ) to the fifth predetermined quantity of the fourth data sub-units to generate the fourth distribution result.

In the image data processing method of the preferred embodiment, (c111) comprises:

(c1111), the calculating module 20311 is configured to calculate a first max value and a first min value of the first predetermined quantity of the red sub-pixel display data (R1, R2, R3, R4).

(c1112), the calculating module 20311 is configured to derive a first difference value between each of the red sub-pixel display data (R1, R2, R3, R4) and the first max value, a second difference value between each of the red sub-pixel display data (R1, R2, R3, R4) and the first min value.

(c1113), the calculating module 20311 is configured to compare the first difference value and the second difference value of each of the red sub-pixel display data to generate the first predetermined quantity of a first comparison result.

(c1114), the calculating module 20311 is configured to determine the shareability of each of the red sub-pixel display data (R1, R2, R3, R4) according to the first predetermined quantity of the first comparison result to generate the first sharable property-values.

(c121) comprises:

(c1211), the calculating module 20311 is configured to calculate a second max value and a second min value of the first predetermined quantity of the green sub-pixel display data (G1, G2, G3, G4) by the calculating module.

(c1212), the calculating module 20311 is configured to derive a third difference value between each of the green sub-pixel display data (G1, G2, G3, G4) and the second max value by the calculating module, and a fourth difference value between each of the green sub-pixel display data (G1, G2, G3, G4) and the second min value by the calculating module.

(c1213), the calculating module 20311 is configured to compare the third difference value and the fourth difference value of each of the green sub-pixel display data (G1, G2, G3, G4) to generate the first predetermined quantity of a second comparison result by the calculating module.

(c1214), the calculating module 20311 configured to determine the shareability of each of the green sub-pixel display data (G1, G2, G3, G4) according to the first predetermined quantity of the second comparison result to generate the second sharable property-values by the calculating module.

(c131) comprises:

(c1311), the calculating module 20311 is configured to calculate a third max value and a third min value of the first predetermined quantity of the blue sub-pixel display data (B1, B2, B3, B4) by the calculating module.

(c1312), the calculating module 20311 is configured to derive a fifth difference value between each of the blue sub-pixel display data (B1, B2, B3, B4) and the third max value by the calculating module, and a sixth difference value between each of the blue sub-pixel display data (B1, B2, B3, B4) and the third min value by the calculating module.

(c1313), the calculating module 20311 is configured to compare the fifth difference value and the sixth difference value of each of the blue sub-pixel display data (B1, B2, B3, B4) to generate the first predetermined quantity of a third comparison result by the calculating module.

(c1314), the calculating module 20311 is configured to determine the shareability of each of the blue sub-pixel display data (B1, B2, B3, B4) according to the first predetermined quantity of the third comparison result to generate the third sharable property-values by the calculating module.

(c141) comprises:

(c1411), the calculating module 20311 is configured to calculate a fourth max value and a fourth min value of the first predetermined quantity of the white sub-pixel display data (W1, W2, W3, W4) by the calculating module.

(c1412), the calculating module 20311 is configured to derive a seventh difference value between each of the white sub-pixel display data (W1, W2, W3, W4) and the fourth max value by the calculating module, and an eighth difference value between each of the white sub-pixel display data (W1, W2, W3, W4) and the fourth minimum value by the calculating module.

(c1413), the calculating module 20311 is configured to compare the seventh difference value and the eighth difference value of each of the white sub-pixel display data (W1, W2, W3, W4) to generate the first predetermined quantity of a fourth comparison result by the calculating module.

(c1414), the calculating module 20311 is configured to determine the shareability of each of the white sub-pixel display data (W1, W2, W3, W4) according to the first predetermined quantity of the fourth comparison result to generate the fourth sharable property-values by the calculating module.

The present invention is able to raise image contrast while effectively keeping the resolution rate, color tone, and color saturation of an original image without adding any hardware with two columns of cache to eliminate or effectively decrease phenomenon inconsistent with the original image, phenomenon such as color edges, fuzzy edges, or even errors. Meanwhile, the calculation is less complicated and easy to implement in any hardware.

Despite one or more implementations shown and described to the present invention, equivalent variations and modifications based upon the present characteristic and the accompanying drawings will occur to those skilled in the art. The present invention includes all such modifications and variations, and is only limited by the scope of the appended claims. In particular, with regard to the various functions performed by the above-described components, the terms used to describe such components are intended to execute the function corresponding to the specified component (e.g., functionally equivalent) of any component (unless otherwise indicated), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Moreover, terms such as "includes", "having", "has", or variations thereof which are used in the detailed description or the claims are intended to be used in a similar manner to the term "comprising".

Although the present invention has been disclosed as preferred embodiments, the foregoing preferred embodiments are not intended to limit the present invention. Those of ordinary skill in the art, without departing from the spirit and scope of the present invention, can make various kinds of modifications and variations to the present invention. Therefore, the scope of the claims of the present invention must be defined.

What is claimed is:

1. An image data processing method, comprising:

(A) receiving a first display data combination by an image data processing device, the first display data combination comprises a first predetermined quantity of a first pixel display data, the first pixel display data comprises a red sub-pixel display data, a green sub-pixel display data, and a blue sub-pixel display data;

(B) transforming the first display data combination into a second display data by the image data processing device, the second display data combination comprises the first predetermined quantity of a second pixel display data, the second pixel display data comprises the red sub-pixel display data, the green sub-pixel display data, the blue sub-pixel display data, and a white sub-pixel display data;

(C) transforming the second display data combination into a third display data combination by the image data processing device, the third display data combination comprises the first predetermined quantity of a third pixel display data, the third pixel display data comprises any three of the red sub-pixel display data, the green sub-pixel display data, the blue sub-pixel display data, and a white sub-pixel display data, the third display data combination used to display a corresponding image by a pixel array;

(B) further comprises:

(b1) generating the second display data combination by adding the white sub-pixel display data into each of the first pixel display data of the first display data combination by a first transforming module;

the pixel array comprises the first predetermined quantity of pixel units, at least two of the pixel units lined up along a first direction;

each of the pixel unit comprises any three of red sub-pixels according to the red sub-pixel display data, green sub-pixels according to the green sub-pixel display data, blue sub-pixels according to the blue sub-pixel display data, and white sub-pixels according to the white sub-pixel display data, any three of the red sub-pixels, the green sub-pixels, the blue sub-pixels, and the white sub-pixels lined up along the first direction;

along the first direction of the pixel array, at least one green sub-pixel, at least one blue sub-pixel, and at least one white sub-pixel are disposed between any two of the red sub-pixels, at least one red sub-pixel, at least one blue sub-pixel, and at least one white sub-pixel are disposed between any two of the green sub-pixels, at least one green sub-pixel, at least one red sub-pixel, and at least one white sub-pixel are disposed between any two of the blue sub-pixels, at least one green sub-pixel, at least one blue sub-pixel, and at least one red sub-pixel are disposed between any two of the white sub-pixels.

2. The image data processing method according to claim 1, wherein (C) further comprises:

(c1) distributing the red sub-pixel display data by the image data processing device, the green sub-pixel display data, the blue sub-pixel display data, and the white sub-pixel display data of the second display data combination to a predetermined data unit to generate a distribution result; and (c2) generating the third display data combination by the image data processing device according to the distribution result;

the predetermined data unit corresponds to the pixel array, the predetermined unit comprises:

a second predetermined quantity of first data sub-units, the first data sub-units correspond to the red sub-pixels;

a third predetermined quantity of second data sub-units, the second data sub-units correspond to the green sub-pixels;

a fourth predetermined quantity of third data sub-units, the third data sub-units correspond to the blue sub-pixels;

a fifth predetermined quantity of fourth data sub-units, the fourth data sub-units correspond to the white sub-pixels;

a sum of the second predetermined quantity, the third predetermined quantity, the fourth predetermined quantity, and the fifth predetermined quantity is triple the first predetermined quantity, all of the second predetermined quantity, the third predetermined quantity, the fourth predetermined quantity, and the fifth predetermined quantity are less than the first predetermined quantity.

3. The image data processing method according to claim 2, wherein (c1) comprises:

(c11) distributing the first predetermined quantity of the red sub-pixel display data to the second predetermined quantity of the first data sub-units by the image data processing device, to generate a first distribution result;

(c12) distributing the first predetermined quantity of the green sub-pixel display data to the third predetermined quantity of the second data sub-units by the image data processing device, to generate a second distribution result;

(c13) distributing the first predetermined quantity of the blue sub-pixel display data to the fourth predetermined quantity of the third data sub-units by the image data processing device, to generate a third distribution result;

(c14) distributing the first predetermined quantity of the white sub-pixel display data to the fifth predetermined quantity of the fourth data sub-units by the image data processing device, to generate a fourth distribution result;

(c2) further comprises:

(c21) generating the third display data combination by the image data processing device, according to the first distribution result, the second distribution result, the third distribution result, and the fourth distribution result.

4. The image data processing method according to claim 3, wherein (c11) comprises:

(c111) calculating a first sharable property-value of each of the red sub-pixel display data by the image data processing device;

(c112) selecting the second predetermined quantity of the red sub-pixel display data from the first predetermined quantity of the red sub-pixel display data by the image data processing device, based on each of the first sharable property-values; and (c113) disposing the second predetermined quantity of the red sub-pixel display data to the second predetermined quantity of the first data sub-units by the image data processing device, to generate the first distribution result;

(c12) comprises:

(c121) calculating a second sharable property-value of each of the green sub-pixel display data by the image data processing device;

(c122) selecting the third predetermined quantity of the green sub-pixel display data from the first predetermined quantity of the green sub-pixel display data by the image data processing device, based on each of the second sharable property-values; and (c123) disposing the third predetermined quantity of the green sub-pixel display data to the third predetermined quantity of the second data sub-units by the image data processing device, to generate the second distribution result;

(c13) comprises:

(c131) calculating a third sharable property-value of each of the blue sub-pixel display data by the image data processing device;

(c132) selecting the fourth predetermined quantity of the blue sub-pixel display data from the first predetermined quantity of the blue sub-pixel display data by the image data processing device based on each of the third sharable property-values; and (c133) disposing the fourth predetermined quantity of the blue sub-pixel display data to the fourth predetermined quantity of the third data sub-units by the image data processing device, to generate the third distribution result;

(c14) comprises:

(c141) calculating a fourth sharable property-value of each of the white sub-pixel display data by the image data processing device;

(c142) selecting the fifth predetermined quantity of the white sub-pixel display data from the first predetermined quantity of the white sub-pixel display data by the image data processing device based on each of the fourth sharable property-values; and (c143) disposing the fifth predetermined quantity of the white sub-pixel display data to the fifth predetermined quantity of the fourth data sub-units by the image data processing device to generate the fourth distribution result.

5. An image data processing method, comprising:

(A) receiving a first display data combination by an image data processing device, the first display data combination comprises a first predetermined quantity of a first pixel display data, the first pixel display data comprises a red sub-pixel display data, a green sub-pixel display data, and a blue sub-pixel display data;

(B) transforming the first display data combination into a second display data combination by the image data processing device, the second display data combination comprises the first predetermined quantity of a second pixel display data, the second pixel display data comprises the red sub-pixel display data, the green sub-pixel display data, the blue sub-pixel display data, and a white sub-pixel display data;

(C) transforming the second display data combination into a third display data combination by the image data processing device, the third display data combination comprises the first predetermined quantity of a third pixel display data, the third pixel display data comprises any three of the red sub-pixel display data, the green sub-pixel display data, the blue sub-pixel display data, and a white sub-pixel display data, the third display data combination used to display a corresponding image by a pixel array;

wherein the pixel array comprises the first predetermined quantity of pixel units, at least two of the pixel units lined up along a first direction;

each of the pixel unit comprises any three of red sub-pixels according to the red sub-pixel display data, green sub-pixels according to the green sub-pixel display data, blue sub-pixels according to the blue sub-pixel display data, and white sub-pixels according to the white sub-pixel display data, any three of the red sub-pixels, the green sub-pixels, the blue sub-pixels, and the white sub-pixels lined up along the first direction;

along the first direction of the pixel array, at least one green sub-pixel, at least one blue sub-pixel, and at least one white sub-pixel are disposed between any two of the red sub pixels, at least one red sub-pixel, at least one blue sub-pixel, and at least one white sub-pixel are disposed between any two of the green sub-pixels, at least one green sub-pixel, at least one red sub-pixel, and at least one white sub-pixel are disposed between any two of the blue sub-pixels, at least one green sub-pixel, at least one blue sub-pixel, and at least one red sub-pixel are disposed between any two of the white sub-pixels.

6. The image data processing method according to claim 5, wherein (B) comprises:

(b1) generating the second display data combination by adding the white sub-pixel display data into each of the first pixel display data of the first display data combination by a first transforming module.

7. The image data processing method according to claim 5, wherein (C) further comprises:

(c1) distributing the red sub-pixel display data by the image data processing device, the green sub-pixel display data, the blue sub-pixel display data, and the white sub-pixel display data of the second display data combination to a predetermined data unit to generate a distribution result; and (c2) generating the third display data combination by the image data processing device according to the distribution result;

the predetermined data unit corresponds to the pixel array, the predetermined unit comprises:

a second predetermined quantity of first data sub-units, the first data sub-units correspond to the red sub-pixels;

a third predetermined quantity of second data sub-units, the second data sub-units correspond to the green sub-pixels;

a fourth predetermined quantity of third data sub-units, the third data sub-units correspond to the blue sub-pixels;

a fifth predetermined quantity of fourth data sub-units, the fourth data sub-units correspond to the white sub-pixels;

a sum of the second predetermined quantity, the third predetermined quantity, the fourth predetermined quantity, and the fifth predetermined quantity is triple the first predetermined quantity, all of the second predetermined quantity, the third predetermined quantity, the fourth predetermined quantity, and the fifth predetermined quantity are less than the first predetermined quantity.

8. The image data processing method according to claim 7, wherein (c1) comprises:

(c11) distributing the first predetermined quantity of the red sub-pixel display data to the second predetermined quantity of the first data sub-units by the image data processing device, to generate a first distribution result;

(c12) distributing the first predetermined quantity of the green sub-pixel display data to the third predetermined quantity of the second data sub-units by the image data processing device, to generate a second distribution result;

(c13) distributing the first predetermined quantity of the blue sub-pixel display data to the fourth predetermined quantity of the third data sub-units by the image data processing device, to generate a third distribution result;

(c14) distributing the first predetermined quantity of the white sub-pixel display data to the fifth predetermined quantity of the fourth data sub-units by the image data processing device, to generate a fourth distribution result;

(c2) further comprises:

(c21) generating the third display data combination by the image data processing device according to the first distribution result, the second distribution result, the third distribution result, and the fourth distribution result.

9. The image data processing method according to claim 8, wherein (c11) comprises:

distributing the first predetermined quantity of the red sub-pixel display data to the second predetermined quantity of the first data sub-units with a first predetermined order by a distribution module to generate the first distribution result;

(c12) comprises:

distributing the first predetermined quantity of the green sub-pixel display data to the third predetermined quantity of the second data sub-units with a second predetermined order by the distribution module to generate the second distribution result;

(c13) comprises:

distributing the first predetermined quantity of the blue sub-pixel display data to the fourth predetermined quantity of the third data sub-units with a third predetermined order by the distribution module to generate the third distribution result;

(c14) comprises:

distributing the first predetermined quantity of the white sub-pixel display data to the fifth predetermined quantity of the fourth data sub-units with a fourth predetermined order by the distribution module to generate the fourth distribution result.

10. The image data processing method according to claim 8, wherein (c11) comprises:

(c111) calculating a first sharable property-value of each of the red sub-pixel display data by the image data processing, device;

(c112) selecting the second predetermined quantity of the red sub-pixel display data from the first predetermined quantity of the red sub-pixel display data by the image data processing device based on each of the first sharable property-values; and (c113) disposing the second predetermined quantity of the red sub-pixel display data to the second predetermined quantity of the first data sub-units by the image data processing device, to generate the first distribution result;

(c12) comprises:

(c121) calculating a second sharable property-value of each of the green sub-pixel display data by the image data processing device;

(c122) selecting the third predetermined quantity of the green sub-pixel display data from the first predetermined quantity of the green sub-pixel display data by the image data processing device based on each of the second sharable property-values; and (c123) disposing the third predetermined quantity of the green sub-pixel display data to the third predetermined quantity of the second data sub-units by the image data processing device, to generate the second distribution result;

(c13) comprises:

(c131) calculating a third sharable property-value of each of the blue sub-pixel display data by the image data processing device;

(c132) selecting the fourth predetermined quantity of the blue sub-pixel display data from the first predetermined quantity of the blue sub-pixel display data by the image data processing device based on each of the third sharable property-values; and (c133) disposing the fourth predetermined quantity of the blue sub-pixel display data to the fourth predetermined quantity of the third data sub-units by the image data processing device, to generate the third distribution result;

(c14) comprises:

(c141) calculating a fourth sharable property-value of each of the white sub-pixel display data by the image data processing device;

(c142) selecting the fifth predetermined quantity of the white sub-pixel display data from the first predetermined quantity of the white sub-pixel display data by the image data processing device based on each of the fourth sharable property-values; and (c143) disposing the fifth predetermined quantity of the white sub-pixel display data to the fifth predetermined quantity of the fourth data sub-units by the image data processing device, to generate the fourth distribution result.

11. The image data processing method according to claim 10, wherein (c111) comprises:

(c1111) calculating a first max value and a first min value of the first predetermined quantity of the red sub-pixel display data by a calculating module;

(c1112) deriving a first difference value between each of the red sub-pixel display data and the first max value by the calculating module, and a second difference value between each of the red sub-pixel display data and the first min value by the calculating module;

(c1113) comparing the first difference value and the second difference value of each of the red sub-pixel display data to generate the first predetermined quantity of a first comparison result by the calculating module; and (c1114) determining the shareability of each of the red sub-pixel display data according to the first predetermined quantity of the first comparison result to generate the first sharable property-values by the calculating module;

(c121) comprises:

(c1211) calculating a second max value and a second min value of the first predetermined quantity of the green sub-pixel display data by the calculating module;

(c1212) deriving a third difference value between each of the green sub-pixel display data and the second max value by the calculating module, and a fourth difference value between each of the green sub-pixel display data and the second min value by the calculating module;

(c1213) comparing the third difference value and the fourth difference value of each of the green sub-pixel display data to generate the first predetermined quantity of a second comparison result by the calculating module; and (c1214) determining the shareability of each of the green sub-pixel display data according to the first predetermined quantity of the second comparison result to generate the second sharable property-values by the calculating module;

(c131) comprises:

(c1311) calculating a third max value and a third min value of the first predetermined quantity of the blue sub-pixel display data by the calculating module;

(c1312) deriving a fifth difference value between each of the blue sub-pixel display data and the third max value by the calculating module, and a sixth difference value between each of the blue sub-pixel display data and the third min value by the calculating module;

(c1313) comparing the fifth difference value and the sixth difference value of each of the blue sub-pixel display data to generate the first predetermined quantity of a third comparison result by the calculating module; and (c1314) determining the shareability of each of the blue sub-pixel display data according to the first predetermined quantity of the third comparison result to generate the third sharable property-values by the calculating module;

(c141) comprises:

(c1411) calculating a fourth max value and a fourth min value of the first predetermined quantity of the white sub-pixel display data by the calculating module;

(c1412) deriving a seventh difference value between each of the white sub-pixel display data and the fourth max value by the calculating module, and an eighth difference value between each of the white sub-pixel display data and the fourth min value by the calculating module;

(c1413) comparing the seventh difference value and the eighth difference value of each of the white sub-pixel display data to generate the first predetermined quantity of a fourth comparison result by the calculating module; and (c1414), determining the shareability of each of the white sub-pixel display data according to the first predetermined quantity of the fourth comparison result to generate the fourth sharable property-values by the calculating module.

12. An image data processing device, comprising:

a receiving module configured to receive a first display data combination, the first display data combination comprises a first predetermined quantity of a first pixel display data, the first pixel display data comprises a red sub-pixel display data, a green sub-pixel display data, and a blue sub-pixel display data;

a first transforming module configured to transform the first display data combination into a second display data combination, the second display data combination comprises the first predetermined quantity of a second pixel display data, the second pixel display data comprises the red sub-pixel display data, the green sub-pixel display data, the blue sub-pixel display data, and a white sub-pixel display data; and a second transforming module configured to transform the second display data combination into a third display data combination, the third display data combination comprises the first predetermined quantity of a third pixel display data, the third pixel display data comprises any three of the red sub-pixel display data, the green sub-pixel display data, the blue sub-pixel display data, and the white sub-pixel display data, the third display data combination used to display a corresponding image by a pixel array;

wherein the pixel array comprises the first predetermined quantity of pixel units, at least two of the pixel units lined up along a first direction;

each of the pixel unit comprises any three of red sub-pixels according to the red sub-pixel display data, green sub-pixels according to the green sub-pixel display data, blue sub-pixels according to the blue sub-pixel display data, and white sub-pixels according to the white sub-pixel display data, any three of the red sub-pixels, the green sub-pixels, the blue sub-pixels, and the white sub-pixels lined up along the first direction;

along the first direction of the pixel array, at least one green sub-pixel, at least one blue sub-pixel, and at least one white sub-pixel are disposed between any two of the red sub-pixels, at between any two of the green sub-pixels, at least one green sub-pixel, at least one red sub-pixel, and at least one white sub-pixel are disposed between any two of the blue sub-pixels, at least one green sub-pixel, at least one blue sub-pixel, and at least one red sub-pixel are disposed between any two of the white sub-pixels.

13. The image data processing device according to claim 12, wherein the first transforming module is further configured to generate the second display data combination by adding the white sub-pixel display data into each of the first pixel display data of the first display data combination.

14. The image data processing device according to claim 12, wherein the second transforming module comprises:

a distributing module configured to distribute the red sub-pixel display data, the green sub-pixel display data, the blue sub-pixel display data, and the white sub-pixel display data of the second display data combination to a predetermined data unit to generate a distribution result; and a third display data combination generating module configured to generate the third display data combination by the distribution result;

the predetermined data unit corresponds to the pixel array, the predetermined unit comprises:

a second predetermined quantity of first data sub-units, the first data sub-units correspond to the red sub-pixels;

a third predetermined quantity of second data sub-units, the second data sub-units correspond to the green sub-pixels;

a fourth predetermined quantity of third data sub-units, the third data sub-units correspond to the blue sub-pixels;

a fifth predetermined quantity of fourth data sub-units, the fourth data sub-units correspond to the white sub-pixels;

a sum of the second predetermined quantity, the third predetermined quantity, the fourth predetermined quantity, and the fifth predetermined quantity is triple the first predetermined quantity, all of the second predetermined quantity, the third predetermined quantity, the fourth predetermined quantity, and the fifth predetermined quantity are less than the first predetermined quantity.

15. The image data processing device according to claim 14, wherein the distributing module is further configured to distribute the first predetermined quantity of the red sub-pixel display data to the second predetermined quantity of the first data sub-units to generate a first distribution result;

the distributing module is further configured to distribute the first predetermined quantity of the green sub-pixel display data to the third predetermined quantity of the second data sub-units to generate a second distribution result;

the distributing module is further configured to distribute the first predetermined quantity of the blue sub-pixel display data to the fourth predetermined quantity of the third data sub-units to generate a third distribution result;

the distributing module is further configured to distribute the first predetermined quantity of the white sub-pixel display data to the fifth predetermined quantity of the fourth data sub-units to generate a fourth distribution result;

the third display data combination generating module is further configured to generate the third display data combination according to the first distribution result, the second distribution result, the third distribution result, and the fourth distribution result.

16. The image data processing device according to claim 15, wherein the distributing module is further configured to distribute the first predetermined quantity of the red sub-pixel display data to the second predetermined quantity of the first data sub-units with a first predetermined order by a distribution module to generate the first distribution result;

the distributing module further configured to distribute the first predetermined quantity of the green sub-pixel display data to the third predetermined quantity of the second data sub-units with a second predetermined order by the distribution module to generate the second distribution result;

the distributing module is further configured to distribute the first predetermined quantity of the blue sub-pixel display data to the fourth predetermined quantity of the third data sub-units with a third predetermined order by the distribution module to generate the third distribution result;

the distributing module is further configured to distribute the first predetermined quantity of the white sub-pixel display data to the fifth predetermined quantity of the fourth data sub-units with a fourth predetermined order by the distribution module to generate the fourth distribution result.

17. The image data processing device according to claim 12, wherein the distributing module comprises:

a calculating module configured to calculate a first sharable property-value of each of the red sub-pixel display data, a second sharable property-value of each of the green sub-pixel display data, a third sharable property-value of each of the blue sub-pixel display data, a fourth sharable property-value of each of the white sub-pixel display data;

a selecting module configured to select the second predetermined quantity of the red sub-pixel display data from the first predetermined quantity of the red sub-pixel display data based on each of the first sharable property-values, the third predetermined quantity of the green sub-pixel display data from the first predetermined quantity of the green sub-pixel display data based on each of the second sharable property-values, the fourth predetermined quantity of the blue sub-pixel display data from the first predetermined quantity of the blue sub-pixel display data based on each of the third sharable property-values, the fifth predetermined quantity of the white sub-pixel display data from the first predetermined quantity of the white sub-pixel display data based on each of the fourth sharable property-values; and a disposing module configured to dispose the second predetermined quantity of the red sub-pixel display data to the second predetermined quantity of the first data sub-units to generate the first distribution result, the third predetermined quantity of the green sub-pixel display data to the third predetermined quantity of the second data sub-units to generate the second distribution result, the fourth predetermined quantity of the blue sub-pixel display data to the fourth predetermined quantity of the third data sub-units to generate the third distribution result, the fifth predetermined quantity of the white sub-pixel display data to the fifth predetermined quantity of the fourth data sub-units to generate the fourth distribution result.

18. The image data processing device according to claim 12, wherein the calculating module is further configured to calculate a first max value and a first min value of the first predetermined quantity of the red sub-pixel display data, to derive a first difference value between each of the red sub-pixel display data and the first max value, a second difference value between each of the red sub-pixel display data and the first min value, to compare the first difference value and the second difference value of each of the red sub-pixel display data to generate the first predetermined quantity of a first comparison result, to determine the shareability of each of the red sub-pixel display data according to the first predetermined quantity of the first comparison result to generate the first sharable property-values;

the calculating module is further configured to calculate a second max value and a second min value of the first predetermined quantity of the green sub-pixel display data, to derive a third difference value between each of the green sub-pixel display data and the second max value, a fourth difference value between each of the green sub-pixel display data and the second min value, to compare the third difference value and the fourth difference value of each of the green sub-pixel display data to generate the first predetermined quantity of a second comparison result, to determine the shareability of each of the green sub-pixel display data according to the first predetermined quantity of the second comparison result to generate the second sharable property-values;

the calculating module is further configured to calculate a third max value and a third min value of the first predetermined quantity of the blue sub-pixel display data, to derive a fifth difference value between each of the blue sub-pixel display data and the third max value, a sixth difference value between each of the blue sub-pixel display data and the third min value, to compare the fifth difference value and the sixth difference value of each of the blue sub-pixel display data to generate the first predetermined quantity of a third comparison result, to determine the shareability of each of the blue sub-pixel display data according to the first predetermined quantity of the third comparison result to generate the third sharable property-values;

the calculating module is further configured to calculate a fourth max value and a fourth min value of the first predetermined quantity of the white sub-pixel display data, to derive a seventh difference value between each of the white sub-pixel display data and the fourth max value, an eighth difference value between each of the white sub-pixel display data and the fourth min value, to compare the seventh difference value and the eighth difference value of each of the white sub-pixel display data to generate the first predetermined quantity of a fourth comparison result, to determine the shareability of each of the white sub-pixel display data according to the first predetermined quantity of the fourth comparison result to generate the fourth sharable property-values.

* * * * *